United States Patent
Mo

(10) Patent No.: US 7,944,876 B2
(45) Date of Patent: May 17, 2011

(54) TIME SLOT INTERCHANGE SWITCH WITH BIT ERROR RATE TESTING

(75) Inventor: Jason Mo, Fremont, CA (US)

(73) Assignee: Integrated Device Technology, Inc, San Jose, CA (US)

( * ) Notice: Subject to any disclaimer, the term of this patent is extended or adjusted under 35 U.S.C. 154(b) by 973 days.

(21) Appl. No.: 11/143,010

(22) Filed: Jun. 1, 2005

(65) Prior Publication Data

US 2005/0271045 A1      Dec. 8, 2005

Related U.S. Application Data

(60) Provisional application No. 60/576,730, filed on Jun. 2, 2004.

(51) Int. Cl.
*H04L 12/50* (2006.01)
*H04W 4/00* (2009.01)
*H04Q 11/00* (2006.01)

(52) U.S. Cl. .......... 370/329; 370/366; 370/376

(58) Field of Classification Search ........... 370/329, 370/366
See application file for complete search history.

(56) References Cited

U.S. PATENT DOCUMENTS

| | | | |
|---|---|---|---|
| 4,162,536 A | 7/1979 | Morley | |
| 4,298,929 A | 11/1981 | Capozzi | |
| 4,628,446 A | 12/1986 | Hoffner, II | |
| 4,635,257 A | 1/1987 | Shinohara | |
| 4,728,930 A | 3/1988 | Grote et al. | |
| 5,276,849 A | 1/1994 | Patel | |
| 5,381,419 A | 1/1995 | Zorian | |
| 5,392,403 A | 2/1995 | Kaufmann | |
| 5,602,884 A | 2/1997 | Wieczorkiewicz et al. | |
| 5,726,991 A * | 3/1998 | Chen et al. | 714/704 |
| 5,948,073 A | 9/1999 | Chapin et al. | |
| 6,085,292 A | 7/2000 | McCormack et al. | |
| 6,157,986 A | 12/2000 | Witt | |
| 6,189,073 B1 | 2/2001 | Pawlowski | |
| 6,314,535 B1 | 11/2001 | Morris et al. | |
| 6,393,515 B1 | 5/2002 | Pollack et al. | |
| 6,647,464 B2 | 11/2003 | Riedlinger et al. | |
| 6,678,790 B1 | 1/2004 | Kumar | |
| 2002/0147947 A1 | 10/2002 | Mayweather et al. | |
| 2003/0159081 A1 | 8/2003 | MacLellan et al. | |
| 2003/0198180 A1* | 10/2003 | Cambron | 370/216 |

(Continued)

FOREIGN PATENT DOCUMENTS

JP       11-85620       3/1999

OTHER PUBLICATIONS

"IDT 3.3 Volt Time Slot Interchange Digital Switch With Rate Matching 16,384×16,384 Channels," Integrated Device Technology, Inc., May 2003, pp. 1-37.

(Continued)

*Primary Examiner* — Chirag G Shah
*Assistant Examiner* — Srinivasa R Reddivalam
(74) *Attorney, Agent, or Firm* — Haynes and Boone, LLP

(57) ABSTRACT

In accordance with the invention, time slot interchange switches ("TSIS") with bit error rate testing are described. The bit error rate testing includes creating a channel of data appropriate for bit error rate testing and monitoring the bit error rate testing on that channel.

4 Claims, 11 Drawing Sheets

U.S. PATENT DOCUMENTS

2005/0055488 A1 3/2005 Chuang et al.
2005/0270870 A1 12/2005 Shin et al.

OTHER PUBLICATIONS

"IDT 3.3 Volt Time Slot Interchange Digital Switch With Rate Matching 32,768× 32,768 Channels," Integrated Device Technology, Inc., Oct. 2003, pp. 1-37.
"Time Slot Interchange Digital Switch 256 ×256," Integrated Device Technology, Inc., Jan. 2001, pp. 1-10.
"Flexible Digital Switch with H.110 interface," Zarlink Semiconductor inc., Oct. 2003, pp. 1-86.
Jim Handy, "The Cache Memory Book: The Authoritative Reference on Cache Design", Second Edition, Academic Press, 1998, p. 66.
Office Action mailed Apr. 30, 2007, in related U.S. Appl. No. 11/143,391.
Amendment and Response to Office Action filed Aug. 30, 2007, in related U.S. Appl. No. 11/143,391.
Final Office Action mailed Nov. 26, 2007, in related U.S. Appl. No. 11/143,391.
Amendment (w/ RCE) filed Apr. 25, 2008, in related U.S. Appl. No. 11/143,391.
Office Action mailed Jul. 29, 2008, in related U.S. Appl. No. 11/143,391.
Amendment and Response to Office Action filed Oct. 29, 2008, in related U.S. Appl. No. 11/143,391.
Final Office Action mailed Feb. 3, 2009, in related U.S. Appl. No. 11/143,391.
Patterson et al., "Computer Organization and Design: The Hardware/Software Interface", Third Edition, 2005, p. 503.
Amendment and Response to Final Office Action filed May 4, 2009, in related U.S. Appl. No. 11/143,391.
Office Action mailed Jul. 17, 2009, in related U.S. Appl. No. 11/143,391.
Amendment and Response to Office Action filed Oct. 19, 2009, in related U.S. Appl. No. 11/143,391.
Final Office Action mailed Mar. 4, 2010, in related U.S. Appl. No. 11/143,391.
Webopedia, "Interface", Mar. 17, 2003, pp. 1-3, (http://www.webopedia.com/TERM/i/interface.html).
Wordnet, "Network", p. 1, (http://wordnetweb.princeton.edu/perl/webwn?s=network), Feb. 17, 2010.

\* cited by examiner

| OH\RX Rate | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| R 32M Rate | 511 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 |
| R/2 16M Rate | 511 | '0' | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 |
| R/4 8M Rate | 254 | 255 | 0 | '0' | 1 | 1 | 2 | 2 | 3 | 3 | 4 | 5 | 5 | 6 | 6 | 7 | 7 | 8 | 8 | 9 | 10 | 10 | 11 | 11 | 12 | 13 | 13 | 14 | 14 | 15 | 16 | 16 | 17 | 17 | 18 | 19 | 19 | 20 |
| R/8 4M Rate | 126 | 127 | 127 | 127 | 0 | 1 | 1 | '0' | 1 | 1 | 2 | 2 | 2 | 2 | 3 | 3 | 3 | 3 | 4 | 4 | 4 | 5 | 5 | 5 | 5 | 6 | 6' | 6 | 7 | 7 | 7 | 8 | 8 | 8 | 8 |
| R/8 4M Rate | 62 | 62 | 63 | 63 | 63 | 63 | 63 | '0' | 0 | 0 | 0 | 0 | 1 | 1 | 1 | 1 | 1 | 2 | 2 | 2 | 2 | 2 | 2 | '0' | 2 | 2 | 3 | 3 | 3 | 3 | 3 | 3 | 3 |
| R/16 2M Rate | 30 | 30 | 30 | 30 | 30 | 31 | 31 | 31 | 31 | 31 | 31 | 31 | 0 | 0 | 0 | 0 | 0 | 0 | 0 | 0 | 0 | 0 | 0 | 0 | 1 | 1 | 1 | 1 | 1 | 1 |

FIG. 7D

TIME SLOT INTERCHANGE SWITCH WITH BIT ERROR RATE TESTING

RELATED APPLICATION

The present disclosure claims priority from U.S. Provisional Application Ser. No. 60/576,730, filed on Jun. 2, 2004, herein incorporated by reference in its entirety.

BACKGROUND

1. Field of the Invention

The present invention relates to time slot interchange switches and, in particular, to a time slot interchange switch that includes a bit-error-rate test.

2. Background of the Invention

Time slot interchange switches are finding frequent use in telecommunications systems for switching of data from an input line to an output line. Typically, data is transmitted from a source to a destination over a channel. In a telephone communications network, for example, a channel can contain one voice conversation. At any moment in time, a voice channel can contain an n-bit (e.g., an 8-bit) representation of one sampling of the voice signals. In some embodiments, the analog voice signal can be sampled at a rate of about 8,000 times per second, although other sampling rates can be utilized.

Multiple channels can be placed on a single transmission line using Time Division Multiplexing (TDM). TDM places one channel from each input on the transmission line in a fixed sequence. A complete set of input samples, which includes any number of channels of data, is referred to as a frame. In one example of such a system, if the channel data is sampled at a rate of 8 kHz, the frame rate for the transmission line must also be 8 kHz. If a frame contains 32 channels, then the bit rate transmitted over the transmission line is 2.048 Mbps (8 kHz×32 channels×8 bits). Increasing the transmission line bit rate allows the number of channels in a frame to be increased.

FIGS. 1 and 2 illustrate the operation of a time slot interchange switch (TSIS) 100. As is illustrated in FIG. 1, TSIS 100 can be coupled to input data streams 110-1 through 110-4 and output data streams 120-1 through 120-4. As illustrated in FIG. 2, there can be any number N of input data streams 110 and output data streams 120. Each one of input data streams 110 can carry a channel in each time slot. For example, channel A0 of input stream 110-1 is in time slot 0. A channel is typically n-bits (for example 8-bits or 16 bits) and is typically transmitted serially.

As is illustrated in FIG. 1, TSIS 100 receives each of the channels in input data streams 110 and places the channels in a preprogrammed order in output data streams 120. For example, in the example shown in FIG. 1, channel A0 in time slot 0 of input data stream 110-1 is output in time slot 12 of output data stream 120-3. As is illustrated in FIG. 1, any channel carried in a time slot of input data streams 110 can be routed to any time slot of output data streams 120 by TSIS 100.

Therefore, TSIS 100 can be utilized to move channels in time as well as space. For example, input data streams 110 can be T1 lines, each of which typically carry 24 phone conversations. If some of the channels (which contain portions of individual conversations) need to be routed to a different T1 line to arrive at its appropriate destination, switching those channels to a separate T1 line can be accomplished without switching all of the conversations transmitted on the input T1 line. In some examples, further, an individual input stream 110 can be routed to multiple output streams 120 in a broadcast fashion.

FIG. 2 illustrates a system that can utilize TSIS 100. The input data streams 110-1 through 110-N can be, for example, T1 or E1 lines, sonnet STS3 lines, or any other transmission line that utilizes time domain multiplexing of channel data. As shown in FIG. 2, the input lines carry input data streams 110-1 through 110-N and output lines carry output data streams 120-1 through 120-N. Each of data streams 110-1 through 110-N can be received in an interface unit 130-1 through 130-N, respectively. Interface unit 130-1 through 130-N can be, for example, a T1 or E1 line interface unit (LIU), a SONET termination unit, or other interface to receive a data stream from a transmission medium. In general, interface unit 130-1 through 130-N filters and recovers transmission signals that are transmitted over the various transmission media. The data stream from each of interface units 130-1 through 130-N can then be received in a framer 131-1 through 131-N, respectively. Each of framers 131-1 through 131-N recognizes the incoming frame pulses and generates frame and clock information based on the received frame pulses. The frame and clock information from all of framers 131-1 through 131-N passes through multiplexer 132 to a phase-locked-loop (PLL) 133 that picks the best input to multiplexer 132 to use as a master clock. PLL 133 then generates timing signals, including a clock signal and a frame signal.

The master clock and frame pulse information is sent to all framers 132-1 through 132-N as well as to TSIS 100 and other system devices that deal with the incoming data stream. The data stream from framers 131-1 through 131-N is then input to TSIS 100. TSIS 100 then can switch channels received from input data streams 110-1 to 110-N to time slots amongst output data streams 120-1 through 120-N and couples the output data streams back to framers 131-1 through 131-N, respectively. Framer 131-1 through 131-N, then, adds framing pulses and provides output data streams 131-1 through 131-N to drivers 130-1 through 130-N for subsequent coupling to the output transmission medium.

As such, TSIS 100 can be utilized to switch T1/E1 voice or data channels in a conventional switching system. However, TSIS 100 can also be utilized in a modem switch bank to link incoming data from a local area network to modems. Further, TSIS 100 can be utilized in a wireless base station to connect cellular calls to the publically switched telephone network (PSTN). Further, multimedia gateways can utilize switches in networking environments involving multiple networks and data that includes voice, fax, video, or data.

Therefore, there is an ongoing need to provide time slot interchange switching with increasing capabilities.

SUMMARY

In accordance with the invention, TSIS switches with bit error rate testing are presented. A time slot interchange switch according to the present invention can include a serial to parallel converter receiving at least one data stream and converting each channel data of the at least one data stream from serial to parallel data; a data memory coupled to the serial to parallel converter to receive and store the channel data, at least one channel data in the at least one data stream containing bit error rate data; a connection memory coupled to the data memory, wherein data is read out of data memory in response to addressing data stored in connection memory; a memory controller coupled to data memory to control readout of the bit error rate channel received by the data memory; and a bit error rate receiver coupled to receive the bit error rate channel and calculate a bit error rate; a register block coupled to receive and store the bit error rate channel in a first register and store an address where the bit error rate channel is stored in the data memory. Further, the time slot interchange switch can include a bit error rate transmitter coupled to a multiplexer, wherein the multiplexer can output channel data from the data memory or channel data generated by the bit error rate transmitter, the bit error rate transmitter generating a pseudo random number generated channel data in a time slot determined by an address stored in a third register of the register block.

Accordingly, a method of performing bit error rate testing in a time slot interchange switch can include receiving a bit error rate data channel; storing the bit error rate data channel in a data memory; reading the bit error rate data channel from the data memory in accordance with an address stored in a first register of a register block; calculating a bit error rate from the bit error rate data; and storing the bit error rate in a second register in the register block. Further, the method can also include generating a channel data appropriate for a bit error rate test; and outputting the channel data appropriate for a bit error rate test in an output data stream according to an address stored in a third register of the register block.

These and other embodiments of the invention are further described below with respect to the following figures. It is to be understood that both the foregoing general description and the following detailed description are exemplary and explanatory only and are not restrictive of the invention, as claimed.

BRIEF DESCRIPTION OF THE DRAWINGS

FIGS. 7A through 7F illustrate rate matching that can be utilized in some embodiments of the present invention.

In the figures, elements having the same designation have the same or similar function.

DETAILED DESCRIPTION

Figure 3:
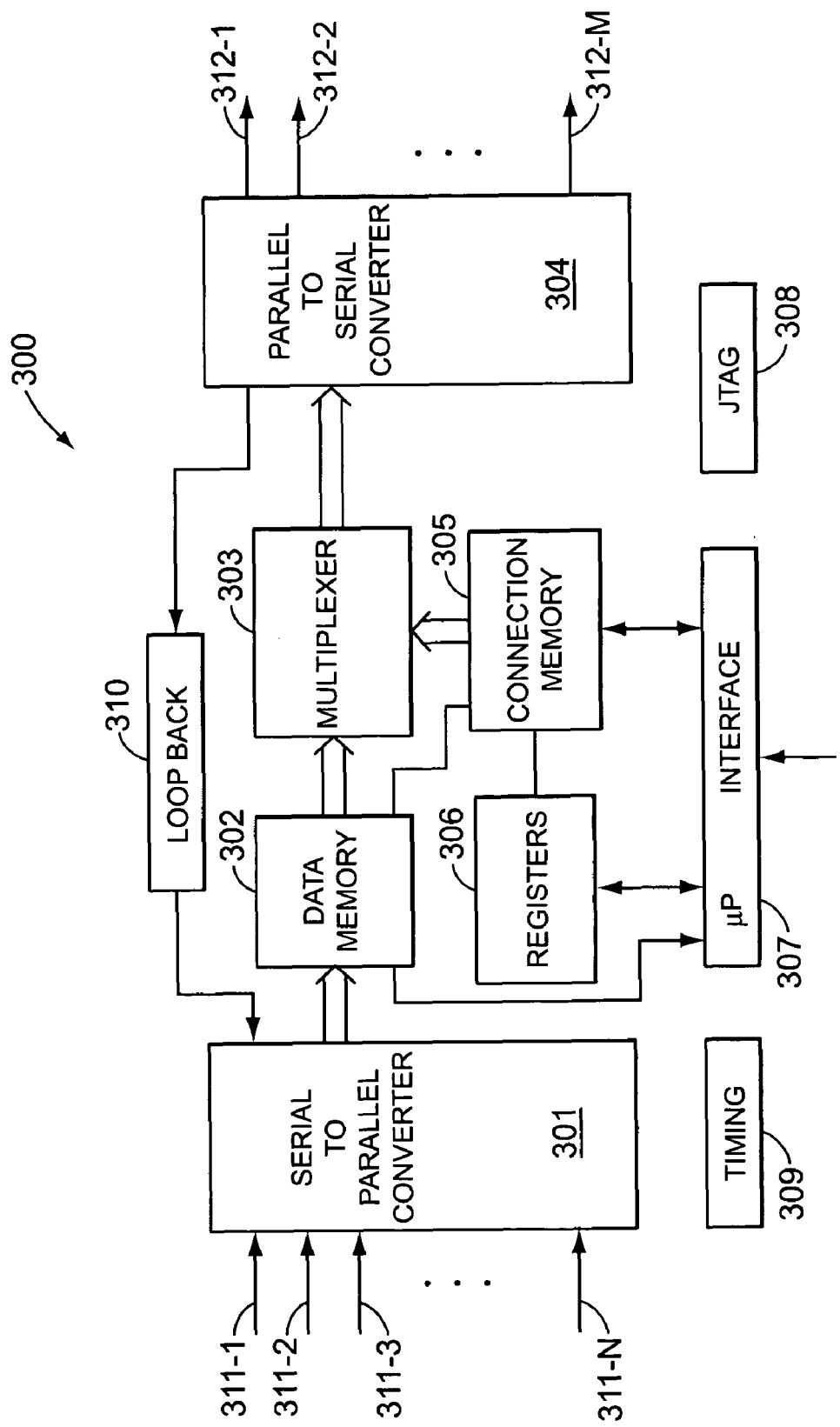
FIG. 3 shows a block diagram of a time slot interchange switch according to some embodiments of the present invention.

FIG. 3 shows a block diagram of a time slot interchange switch (TSIS) 300 according to some embodiments of the present invention. TSIS includes a data memory 302, a connection memory 305, and a multiplexer 303. Data memory 302 stores data corresponding to channels and outputs that data to multiplexer 303 in accordance with connection data stored in connection memory 305. In some embodiments, a serial-to-parallel converter 301 receives data streams 311-1 through 311-N and converts the serial data to n-bit parallel data corresponding to each channel in each time slot before storing that data appropriately in data memory 302. Further, some embodiments can include a parallel-to-serial converter 304 that receives data in a temporal and spatial order determined by connection data stored in connection memory 305 from data memory 302 and provides serial output on output data streams 312-1 through 312-M.

During normal operation, individual channels are converted from n-bit serial data to n-bit parallel data in serial-to-parallel converter 301 and stored in data memory 302. When the proper output channel slot is available, connection memory 305 causes the n-bit parallel data to be passed through multiplexer 303. The n-bit parallel data can then be converted back to n-bit serial data in parallel-to-serial converter 304 and output on the appropriate output data stream 312-1 through 312-M in the appropriate time slot.

In some embodiments, data can be read from data memory 302 by a microprocessor interface 307. Further, connection memory 305 can be read out and written through microprocessor interface 307. Therefore, connection memory 305 and internal registers 306 can be loaded through microprocessor interface 307.

In some embodiments of the invention, data memory 302 can be at least large enough to hold a complete frame of channels for each of input streams 311-1 through 311-N. In some embodiments, data memory 302 can store three or more frames of data. In one time slot, data memory 302 stores one channel from each of data streams 311-1 through 311-N. During time slot 0, for example, data memory 302 stores all of the time slot 0 data for the current output frame of data streams 311-1 through 311-N. Therefore, when it is time to output time slot zero for a particular one of input data streams 311-1 through 311-N, that data is stored in an appropriate location in data memory 302.

Data memory 302 stores incoming channel data until that data can be output in the appropriate time slot of the appropriate one of output data streams 312-1 through 312-M. The address of memory locations in data memory 302, then, can be related to the input stream (i.e., which of input streams 311-1 through 311-N) from which the data came and a time slot in that input stream corresponding to the data. In some embodiments of the invention, the memory address of data stored in data memory 302 is formed from the input stream and time slot numbers. In operation, data memory 302 outputs particular n-bit (often 8-bit) data according to connection data stored in connection memory 305.

In some embodiments, the data contents of data memory 302 can be read by a microprocessor coupled to interface 307. In some embodiments, data may not be written to data memory 302 from interface 307.

Further, in some embodiments data read into data memory 302 can be buffered in order that variable delays in receipt of data can be appropriately handled. The buffering allows data from any input stream 311-1 through 311-N to be held for one or more times in order to create a delay time on that input stream.

Connection memory 305 controls the output of data from data memory 302 to multiplexer 303. Connection memory 305 includes one memory location corresponding with each time slot of each of output streams 311-1 through 311-N. The contents of the memory locations of connection memory 305 hold the address, in some embodiments in time slot and input data stream format, of the data stored in data memory 302 that is to fulfill the time slot of the output stream 312-1 through 312-M. Further, in some embodiments, each memory location in connection memory 305 may also include channel control information. In operation, the connection data stored in connection memory 305 is sequenced in order and the data from data memory 302 that is pointed to in the contents of connection memory 305 is output.

In some embodiments, the contents of connection memory 305 can be read and written through microprocessor interface 307. In some embodiments, a lower connection memory contains the addresses that corresponds to the input channel address (i.e., input data stream and time slot address) while an upper connection memory holds connection data. In some embodiments, each connection memory data can be 16 bits of data with bits 11-15 utilized as control bits. In some embodiments with 8-bit busses, access to connection memory locations is performed twice for a read or write operation.

As previously discussed above, TSIS 300 sequentially accesses the connection data addresses of connection memory 305 and data pointed to by the addresses stored in connection memory 305 are output to multiplexer 303. However, the contents of each location in connection memory 305 also includes control information. In some embodiments, the control information includes a variable or constant delay bit that determines whether that channel is output in order or delayed by a fixed amount, a processor control/channel source bit that allows an individual channel to be placed in a "processor mode," a control channel output bit that can be sequentially output on a CCO pin and that can be utilized to send information to other devices, a loopback bit that allows the output stream for that time slot to be internally tied back to the input stream for diagnostic purposes, and an enable bit that controls the enabling and disabling of the output stream during that particular time slot. If the process control/channel source bit is set, a portion of the connection memory location (e.g., the lower 8-bits) is output as data instead of the corresponding contents of data memory 302. A loopback can be performed through loopback circuit 310.

In some embodiments, a variable time delay may be incorporated by setting the variable/constant time delay flag. In some embodiments, the variable/constant delay flag can be set or not. A variable delay setting can be selected by setting the variable/constant delay flag, otherwise a constant delay is utilized. In a variable delay setting, channel data is output in the first available time slot. Therefore, data that is received in a single frame can be output in different frames. Some of the data may be output in the current frame, however if the appropriate time slot of the current frame has already been transmitted then that channel is output in a later frame. In a constant delay situation, channel data is output together with other channel data of the same frame. In some embodiments in constant delay mode, therefore, channel data may not be output as quickly as it might in a variable delay setting, but all of the data for a frame remains in the same frame.

Internal registers 306 can include several registers for general control of TSIS 300. In some embodiments, internal registers 306 includes a control register for controlling memory addressing; an interface mode selection register for controlling block programming, frame evaluation, and general output enable; a frame alignment register for frame evaluation status and results; and a frame input offset register for programmable per-stream frame offset.

In some embodiments, there may be multiple frame input registers. In some embodiments, TSIS 300 may have a limited number of pins. As a result, there may not be enough address lines to directly address data memory 302 and connection memory 305 through interface 307. A control register in registers 306 can be utilized to set up a pointer to the appropriate memory and stream address for access. The address inputs are then used to select the appropriate channel address. In some embodiments, an address bit can be utilized to indicate whether registers 306 or one of connection memory 305 or data memory 302 is currently being accessed through interface 307. For example, connection memory as discussed before may be divided into low and high sections. Accessing of the connection memory, then, can be accomplished in two steps. In accessing connection memory, the control register can be set to point to the appropriate memory (i.e., data stream and time slot information is loaded) and a flag in the control register can be set to access the high or low sections of the connection memory location.

An interface mode selection register can be utilized to execute connection memory control bit block load procedures, start frame evaluation, enable or disable of all output stream transmit pins, and to set the data rate for those devices with multiple data rate capability. The interface mode selection register, for example, can allow for block load of connection memory 305. In some embodiments, the interface mode selection register can be initialized with the control section of a block of connection memory locations, a block program enable bit can be set, and the contents of connection memory can then be loaded. In some embodiments, connection memory block locations are all set to 0 during a block load.

In some embodiments, TSIS 300 can allow an offset delay for each input stream 311-1 through 311-N with respect to the master frame pulse received in timing 309. Although, in some embodiments, data on input streams 311-1 through 311-N arrive at the same rate, delays in individual input streams can be caused by a variety of situations, including variable path serial backplanes and variable path lengths that may be implemented in large centralized and distributed switching systems. Therefore, in some cases, some of input streams 311-1 through 311-N can be sufficiently skewed to allow erroneous readings of the end of the previous frame at the time of the framing pulse. With the frame input offset register of registers 306, a user can program an offset for each input stream that delays sampling of the first bit of time slot 0 to compensate for the skew. Skew times for individual ones of input streams 311-1 through 311-N can be determined through testing during a startup procedure.

In addition to a frame input offset register of registers 306, a frame alignment register can be included in registers 306. The frame alignment register can be utilized to perform a delay analysis between the master frame pulse signal and an input signal connected to the frame evaluation pin. The frame alignment register can store the amount of delay between the frame evaluation signal and the frame pulse input signal. An additional ½ cycle delay in sampling the input stream can then be affected if the delay is sufficiently long. In some embodiments, the frame input offset register can allow each input stream to be offset by a number of clock cycles by half clock cycles. Registers 306, then, can include several frame input offset registers.

As indicated above, timing unit 309 can provide all of the internal timing for TSIS 300 based on a master clock and a master frame pulse input. Timing unit 309 can also provide the frame evaluation input that supports frame delay evaluations.

Microprocessor interface 307 provides all of the address, data, and control pins necessary to interface TSIS 300 to a microprocessor. In some embodiments, a user can select whether to use non-multiplexed interface or a multiplexed interface, where address and data information share the same lines). In addition, a multiplexed interface can be in either a Motorola or Intel format.

Bit Error Rate Testing

Most embodiments of switches such as TSIS 300 include a bit error rate test (BERT). A pseudo-random bit sequence (PRBS) can be transmitted to output data streams 312-1 through 312-N of TSIS 300. Further, similar pseudo-random bit sequences can be received from channels of input data bit streams 311-1 through 311-N and subsequently read from data memory 302. In a transmitter coupled to TSIS 300 in such a fashion, a particular channel (or channels) can transmit a BER pattern of the form 2^15-1. In embodiments with an 8-bit channel, an 8-bit BER data can be broadcasted to multiple channels which send the same 8 bits during a frame. In some embodiments of the receiver, only one channel can be specified and monitored for BER operation at a given time. In some embodiments of TSIS 300, multiple channels can be monitored in a BER operation. Registers 306 can include a BERT input selection register. The BERT input selection register of registers 306 can be set to determine which of the input channels receives BER data.

Design and implementation of the PRBS generator and accompanying receiver is well known. However, implementing a bit error rate test in a time slot interchange switch can present a significant challenge, especially for receiving data on which to perform a bit error rate calculation. A counter could be designed to track the time when selected channels of the selected streams arrive at output streams 312-1 through 312-M. Once the selected channel arrive, the data in those channels can be input to a bit error rate detector. However, the control circuits to implement this type of bit error rate control would be very complex and difficult to implement.

Figure 4A:
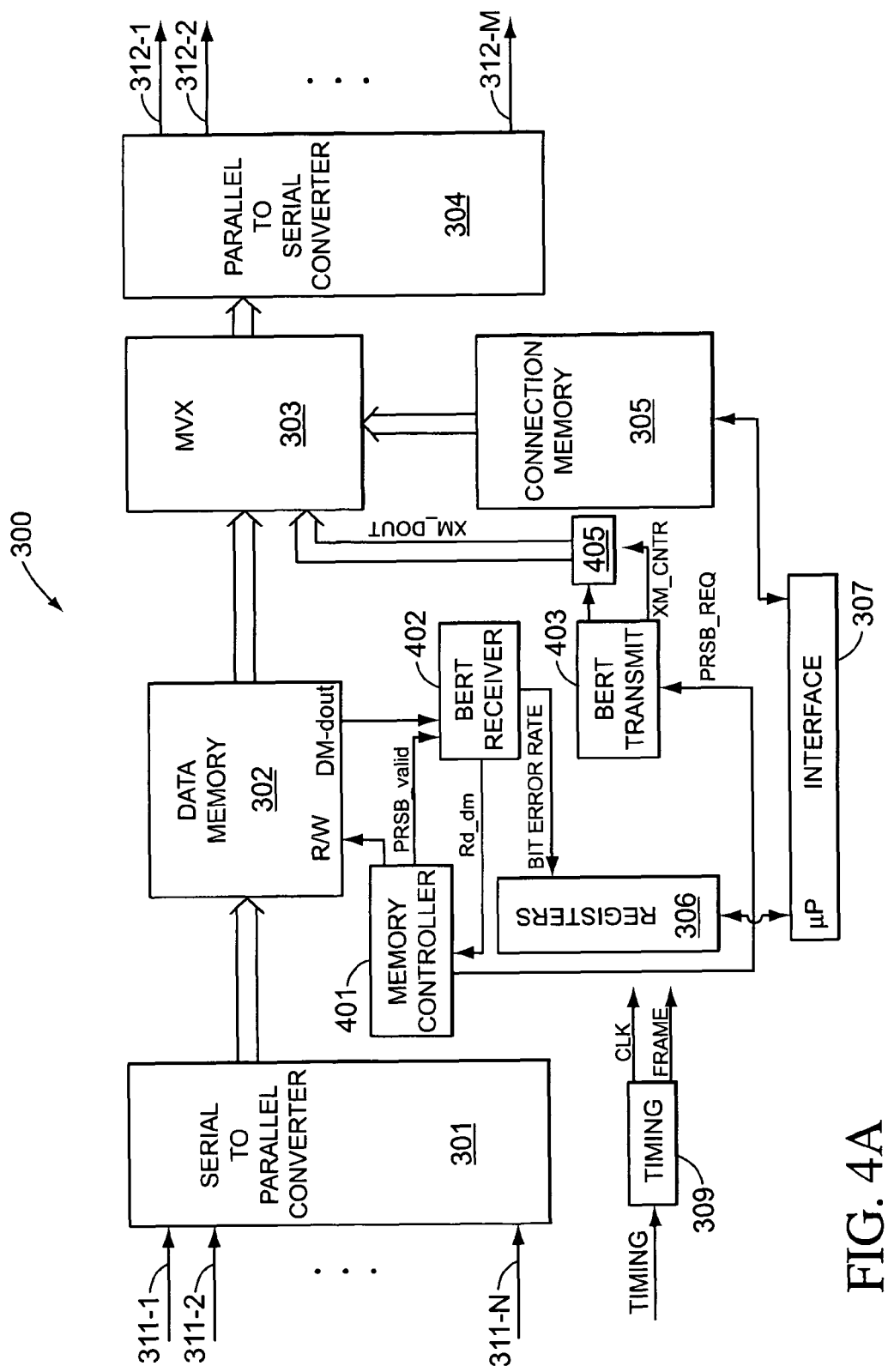
FIGS. 4A and 4B illustrate bit error rate testing according to some embodiments of the present invention.

FIG. 4A illustrates an embodiment of TSIS 300 that includes bit error rate testing according to the present invention. As shown in FIG. 4A, TSIS 300 can include a memory control 401 coupled to data memory 302. Memory control 401 can be coupled to a BERT receiver 402 and a BERT transmitter 403. BERT receiver 402 can request a read from memory controller 401. Memory controller 401 can generate a request signal to BERT transmitter 403 to initiate generation of a burst signal for output from TSIS 300 in selected time slots of data streams 312-1 through 312-M.

As is shown in FIG. 4A, data from all channels are input in data streams 311-1 through 311-N into serial-to-parallel converter 301 and written into data memory 302. Data is then output through multiplexer 303 and parallel to serial converter 304 to output data streams 312-1 through 312-M in response to data held in connection memory 305. In accordance with the present invention, bit error rate testing can be performed by reading data from data memory 302 at the request of memory control 401 to BERT receiver 402. BERT receiver 402 can convert the parallel data received from data memory 302 to serial data and then determine the bit error rate. The bit error rate can be stored in a bit error rate register of registers 306 for later access by a microprocessor through microprocessor interface 307.

Figure 4B:
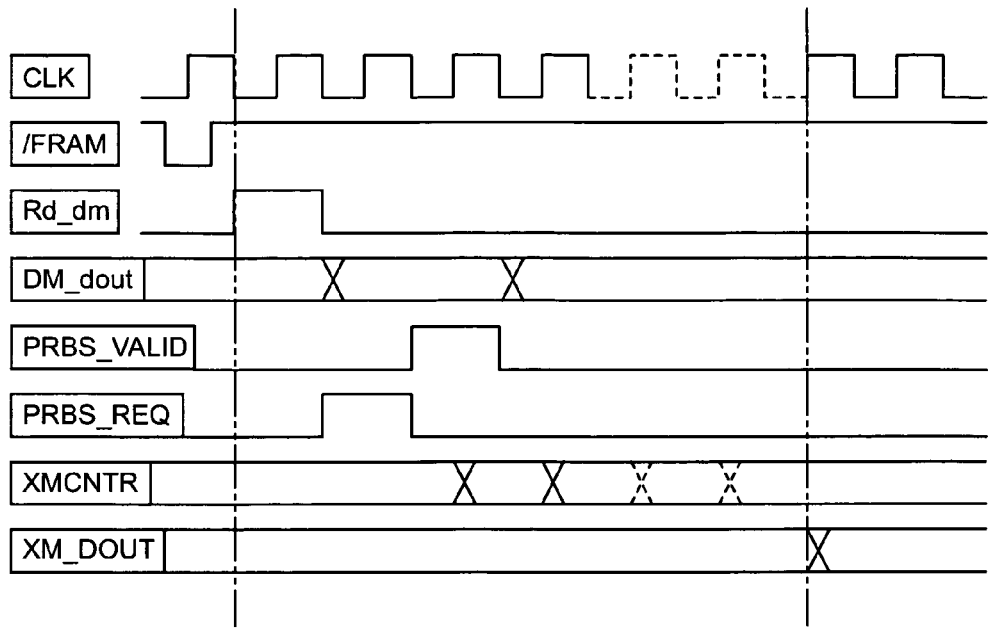

FIG. 4B shows a timing diagram for a bit error rate testing procedure according to the present invention. The timing diagram of FIG. 4B shows a clock signal and a Frame signal. Arrival of the frame pulse signals the beginning of receipt of data in a new frame. A read data memory signal (Rd_dm) can be generated to read data from data memory 302 using a predefined address that was loaded into a BER input selection register of registers 306. The predefined address can be loaded into the BER input selection register through interface 307. The address in the BER input selection register of register 306, then, identifies the channel and input stream that has the bit-error rate data. The data stored in the indicated location of data memory 302, then, can be output to BERT receiver 402 in the next cycle after the Rd_dm pulse. A PRBS_Valid signal can then be utilized to indicate to BERT receiver 402 that the Dm_Dout data can be loaded into PRBS receiver 402. PRBS receiver 402 then detects if there is any error in this data. Reading out of the data from data memory 302 can be accomplished in any clock cycle until that data is rewritten. After some number of clock cycles, for example 8 clock cycles, of detection, PRBS receiver 402 remains idle until another PRBS_Valid signal is indicated. After a sufficient amount of data has been read from the indicated channel (i.e., over several frames of data), then a value for bit error rate can be read from a register in registers 306.

A transmitter design is also straight forward. A PRBS_REQ signal can be generated by memory controller 401 in response to an enable flag set in the control register of registers 406 to activate PRBS transmitter 403. After a number of cycles, for example 10 cycles, transmitter 403 can be clocked 8 times and can output a valid 8 bit BER data (XMCNTR) to latch 405. The transmitter will then idle until a new PRBS_REQ signal is received during a later frame. XMCNTR can be latched to XMDOUT, which can be assigned to any channel of the output streams during transmission in the current frame.

Therefore, bit error rate testing according to the present invention includes reading data from a time slot of an input data stream as indicated in a register, calculating the bit error, and outputting the bit error rate to another register. Random data can be written into a previously determined channel of a particular input data stream. In some embodiments, the data utilized to perform a bit error rate test can be generated in another, up stream, TSIS. In some embodiments, a loopback circuit may be formed to provide data streams output from the TSIS back to the input of the TSIS.

Memory Testing

In some embodiments of a TSIS according to the present invention, fast memory testing of the memory locations in data memory 302 and connection memory 305 can be accomplished. Testing of data memory 302 and connection memory 305 is usually accomplished in a testing apparatus before packaging or shipping a TSIS 300 chip. In conventional systems, extra registers, memory, and pin connections are required to perform such a test. In accordance with the present disclosure, only one extra pin and no extra memory or registers are utilized in the memory testing.

Figure 5:
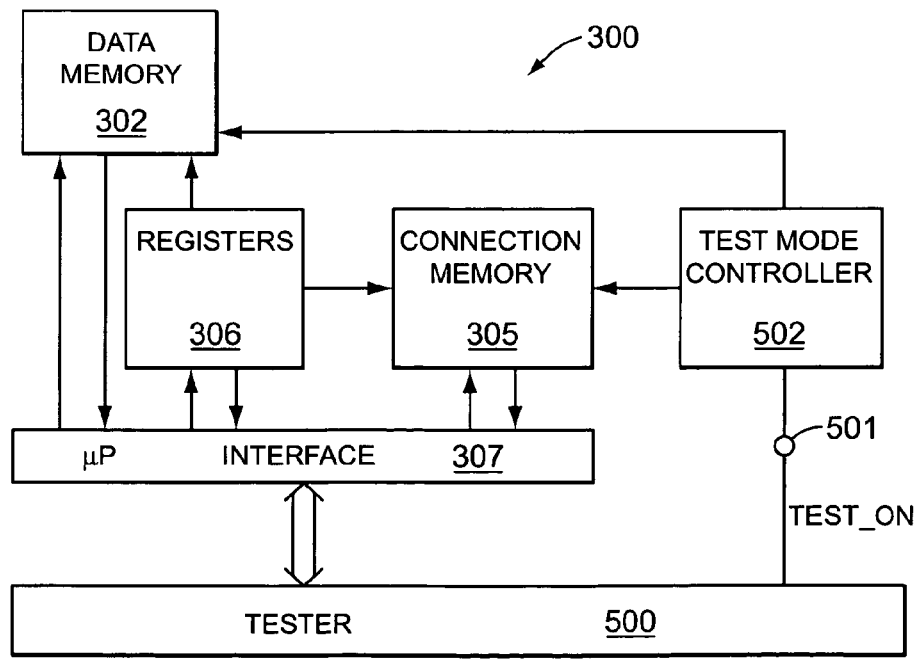
FIG. 5 illustrates a memory testing procedure that can be utilized in some embodiments of the present invention.

FIG. 5 illustrates a TSIS 300 including an embodiment of the memory test according to the present invention. The TSIS 300 chip (either before or after packaging) can be placed in a tester 500 which interacts with TSIS 300 through microprocessor interface 307. A separate test mode pin 501 coupled to a test controller 502 toggles TSIS 300 from normal operation to memory test operation. In some embodiments, pin 501 is held at Vcc for test mode.

When test mode is activated, test controller 502 controls connection memory 305 and data memory 302 to read and write data through microprocessor interface 307. Addresses are held in registers of register 306. Any of the registers may be utilized in portions of the test. These registers are registers that are typically utilized for other purposes during normal operation of TSIS 300. For example, the frame offset register may be utilized to determine type of test. One example of the types of test are shown in Table I, with the settings of the frame offset register for each test is shown.

Tester 500 generates data patterns to write into data memory 302 and connection memory 305 through interface 307 in accordance with the settings of the frame offset register. As opposed to the usual addressing by data stream and time slot, tester 500 bypasses memory controllers that convert addressing in data stream, time slot format to physical memory location (i.e., row and column addressing) in the memory arrays of data memory 302 and connection memory 305. Therefore, testor 500 accesses memory locations in data memory 302 and connection memory 305 using the row and column addresses of those locations. Data memory 302 and connection memory 305 are generally dual port SRAM memory systems with multiple pages of memory blocks. Therefore, testing is accomplished by directly writing to and subsequently reading from the individual SRAM memory locations of data memory 302 and connection memory 305.

and connection memory 305. In test mode, using registers in register 306, individual memory locations in data memory 302 and connection memory 305 can be accessed (i.e. read or written) through interface 307 utilizing a row and column addressing format. Therefore, row testing, column testing, redundant location testing, and burn-in can be accomplished.

A time slot interchange switch according to some embodiments of the present invention therefore can include a data

TABLE I

| Register Value | | | | | | | Test Type | Address | Address |
|---|---|---|---|---|---|---|---|---|---|
| 6 | 5 | 4 | 3 | 2 | 1 | 0 | mem. Type and Address | RD Port | Wrt Port |
| 1 | x | x | 1 | 1 | 1 | 1 | Conn. Mem. Low (x15) | A | A |
|   |   |   |   | 1 | 1 | 0 | Data Mem Bank 0 Page 0 | A, B | A |
|   |   |   |   | 1 | 0 | 1 | Data Mem Bank 0 Page 1 | A, B | A |
|   |   |   |   | 1 | 0 | 0 | Data Mem Bank 0 Page 2 | A, B | A |
|   |   |   |   | 0 | 1 | 1 | Conn. Mem. High (x3) | A | A |
|   |   |   |   | 0 | 1 | 0 | Data Mem Bank 1 Page 0 | A, B | A |
|   |   |   |   | 0 | 0 | 1 | Data Mem Bank 1, Page 1 | A, B | A |
|   |   |   |   | 0 | 0 | 0 | Data Mem Bank 1 Page 2 | A, B | A |
| 1 | 1 | 0 | 0 | 1 | 1 | 1 | Redundant Row Test | Conn. Mem. | Low (x15) |
|   |   |   |   | 1 | 1 | 0 |   | Data Mem | Bank 0 Page 0 |
|   |   |   |   | 1 | 0 | 1 |   | Data Mem | Bank 0 Page 1 |
|   |   |   |   | 1 | 0 | 0 |   | Data Mem | Bank 0 Page 2 |
|   |   |   |   | 0 | 1 | 1 |   | Conn. Mem. | High (x3) |
|   |   |   |   | 0 | 1 | 0 |   | Data Mem | Bank 1 Page 0 |
|   |   |   |   | 0 | 0 | 1 |   | Data Mem | Bank 1 Page 1 |
|   |   |   |   | 0 | 0 | 0 |   | Data Mem | Bank 1 Page 2 |
| 1 | 0 | 1 | 0 | 1 | 1 | 1 | Redundant Col. Test | Conn. em | Low (x15) |
|   |   |   |   | 1 | 1 | 0 |   | Data Mem | Bank 0 Page 0 |
|   |   |   |   | 1 | 0 | 1 |   | Data Mem | Bank 0 Page 1 |
|   |   |   |   | 1 | 0 | 0 |   | Data Mem | Bank 0 Page 2 |
|   |   |   |   | 0 | 1 | 1 |   | Conn. Mem | High (x3) |
|   |   |   |   | 0 | 1 | 0 |   | Data Mem | Bank 1 Page 0 |
|   |   |   |   | 0 | 0 | 1 |   | Data Mem | Bank 1 Page 1 |
|   |   |   |   | 0 | 0 | 0 |   | Data Mem | Bank 1 Page 2 |
| 0 | x | x | x | 1 | 1 | 1 | Burn-In Test | Conn. Mem | Low (x15) |
|   |   |   |   | 1 | 1 | 0 |   | Data Mem | Bank 0 Page 0 |
|   |   |   |   | 1 | 0 | 1 |   | Data Mem | Bank 0 Page 1 |
|   |   |   |   | 1 | 0 | 0 |   | Data Mem | Bank 0 Page 2 |
|   |   |   |   | 0 | 1 | 1 |   | Conn. Mem | High (x3) |
|   |   |   |   | 0 | 1 | 0 |   | Data Mem | Bank 1 Page 0 |
|   |   |   |   | 0 | 0 | 1 |   | Data Mem | Bank 1 Page 1 |
|   |   |   |   | 0 | 0 | 0 |   | Data Mem | Bank 1 Page 2 |

Once Tester 500 has written a pattern of data into data memory 302 and/or connection memory 305, that data is read out via interface 307 and compared with the written pattern. If there are discrepancies, then substitute memory locations can be substituted for the malfunctioning locations.

Row and column testing, therefore, can be accomplished with tester 500. In addition, redundant column and redundant row testing can also be accomplished without blowing any fuse. In that case, the redundant memory locations can also be tested without actually bringing them into a replacement position in the memory array.

In addition to row-column testing and redundancy testing, a burn-in test can be accomplished. A burn-in test is typically a reliability test where data patterns are repeatedly written into memory (e.g., data memory 302 and connection memory 305). Usually, a long period (e.g., a few hours to a few hundreds of hours) of repeated writes is followed by a single read of the data to check reliability.

Embodiments of TSIS according to the present invention can include a memory test circuit that does not utilize any new registers and which requires only one extra pin to implement. Once a test mode is indicated on the pin, then test mode controller 502, which controls access to data memory 302 and connection memory 305, bypasses the usual memory controller access to individual memory locations in data memory 302 memory coupled to receive and store channel data from at least one data stream; a connection memory coupled to the data memory, wherein channel data can be read out of data memory in accordance with addresses stored in the connection memory; a register block coupled to the data memory and the connection memory; and a test mode controller coupled to the data memory, the connection memory, and a test pin, wherein when a test mode is activated by the test pin, a tester can read and write to memory locations in data memory and connection memory utilizing direct row and column addressing. In some embodiments, the tester can write and subsequently read patterns of data in the data memory and the connection memory to determine validity of memory locations in the data memory and the connection memory. Further, in some embodiments, the tester can perform redundant cell tests and burn-in tests.

Accordingly, a method of testing memory in a time slot interchange switch according to the present invention can include placing the time slot interchange switch in a tester that activates a test mode through a test pin; directly writing using row and column addresses data patterns into a data memory and a connection memory; directly reading read data using row and column addresses data from the data memory and the connection memory; and comparing the data patterns with the read data to determine validity of memory locations in the data memory and the connection memory. Redundant cells can be similarly tested. Further, burn-in testing can be accomplished by repeatedly writing patterned data to memory locations in the data memory and the connection memory; after a predetermined time, reading read data from the data memory and the connection memory; and comparing the patterned data with the read data to determining the validity of memory locations in the data memory and the connection memory.

Shared Data Bus

In some embodiments of the invention, a TSIS 300 according to the present invention can include a single shared data bus between data memory 302 and connection memory 305. Such an arrangement decreases the number of lines, reducing the area required on the chip.

Figure 6:
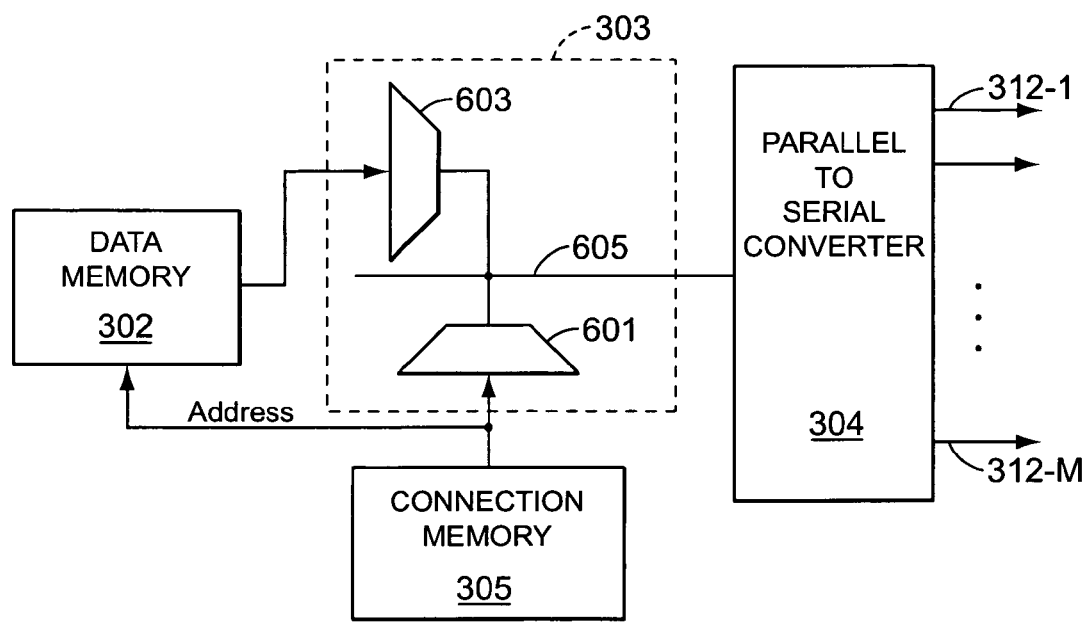
FIG. 6 illustrates a shared data bus that can be utilized in some embodiments of the present invention.

FIG. 6 illustrates a TSIS 300 with a shared data bus between data memory 302 and connection memory 305. As before, connection memory 305 is coupled to supply an address to data memory 302. However, data from data memory 302 is coupled through multiplexer 603 to shared data bus 605 and the data output from connection memory 305 is coupled through multiplexer 601 to shared data bus 605. In normal operation, data from connection memory 305 is blocked by multiplexer 601 and data from data memory 302 corresponding to the address supplied by connection memory 305 is presented on data bus 605 through multiplexer 603. In processor mode, where data from connection memory 305 is output by TSIS 300 instead of data from data memory 302, data from data memory 302 is blocked by multiplexer 603 while data from connection memory 305 is output. The data contained in connection memory 305 can originate from a microprocessor coupled to interface 307.

As is illustrated in FIG. 6, in order to reduce the number of lines, multiplexer 603 should be located as close as possible to data memory 302 and multiplexer 601 should be located as closely as possible to connection memory 305. Further, multiplexers 603 and 601 should both be as close as possible to data bus 605.

A time slot interchange switch according to some embodiments of the present invention can include a data memory coupled to receive channel data in at least one data stream and to provide channel data at a multiplexer; and a connection memory coupled to provide an address for reading channel data from the data memory to the multiplexer and further coupled to provide data to the multiplexer, wherein the data memory and the connection memory share a shared data bus. As a result, the multiplexer includes a first multiplexer to couple data from the connection memory onto the shared data bus and a second multiplexer to coupled data from the data memory onto the shared data bus.

Rate Matching

In some embodiments, each of input data streams 311-1 through 311-N and each of output data streams 312-1 through 312-M may be at different data rates. In some embodiments, some of input data streams 311-1 through 311-N are at one rate while others of input data streams 311-1 through 311-N may be at a different rate. In some embodiments, all of input data streams 311-1 through 311-N operate at the same rate while all of 312-1 through 312-N operate at a different rate. In some embodiments, the clock rates 32, 16, 8, and 4 MHz are available for operation. The particular clock rate for a specific data stream can be set in a register of registers 306.

FIG. 7B illustrates a conventional method of rate matching. As can be seen in FIG. 7B, data is written only into its time slot in data memory 302 regardless of the rate. The storage location in data memory 302 where the channel data is loaded is determined by a timing match between the actual rate and the fastest possible data rate that can be received by TSIS 300, R. Therefore, in the R/4 data rate, the first channel is written into the fifth time slot. However, a great deal of circuitry is required to insure that the data received at a rate R is presented appropriately for a R/4 data rate. Conversely, it is also difficult to determine location in data memory 302 where a channel should be stored for a lower rate.

FIG. 7C illustrates a method of rate matching according to the present invention. Here, the timing is according to the highest data rate R regardless of which rate of data presentation is used. Therefore, if data is presented at R/4 and then presented at rate R (e.g., receiving data at 8 Mb/s when R is 32 Mb/s), the channel data in the zero'th time slot is presented in time periods 0 through 3 while the channel data in the first time slot is presented in time periods 4 through 7. In that way, there is data presented in the appropriate time slot for each of the data rates.

FIG. 7D illustrates the cell access position map for data rates of 32 Mhz, 16 MHz, 8 MHz, 4 MHz, and 2 MHz. In the example shown in FIG. 7D, R=32 Mb/s. In a 32 MHz rate, all locations are read out. In a 16 MHz bit stream, then, data is read out from time slot position 3, 5, 7, 9, etc. In an 8 MHz bit stream, data is read from time slot positions 7, 11, 15, 19, etc. In a 4 MHz bit stream data is read from time slot positions 15, 23, 31, etc. In a 2 MHz bit stream, data is read from time slot positions 31, 47, 63, etc.

Figure 7A:
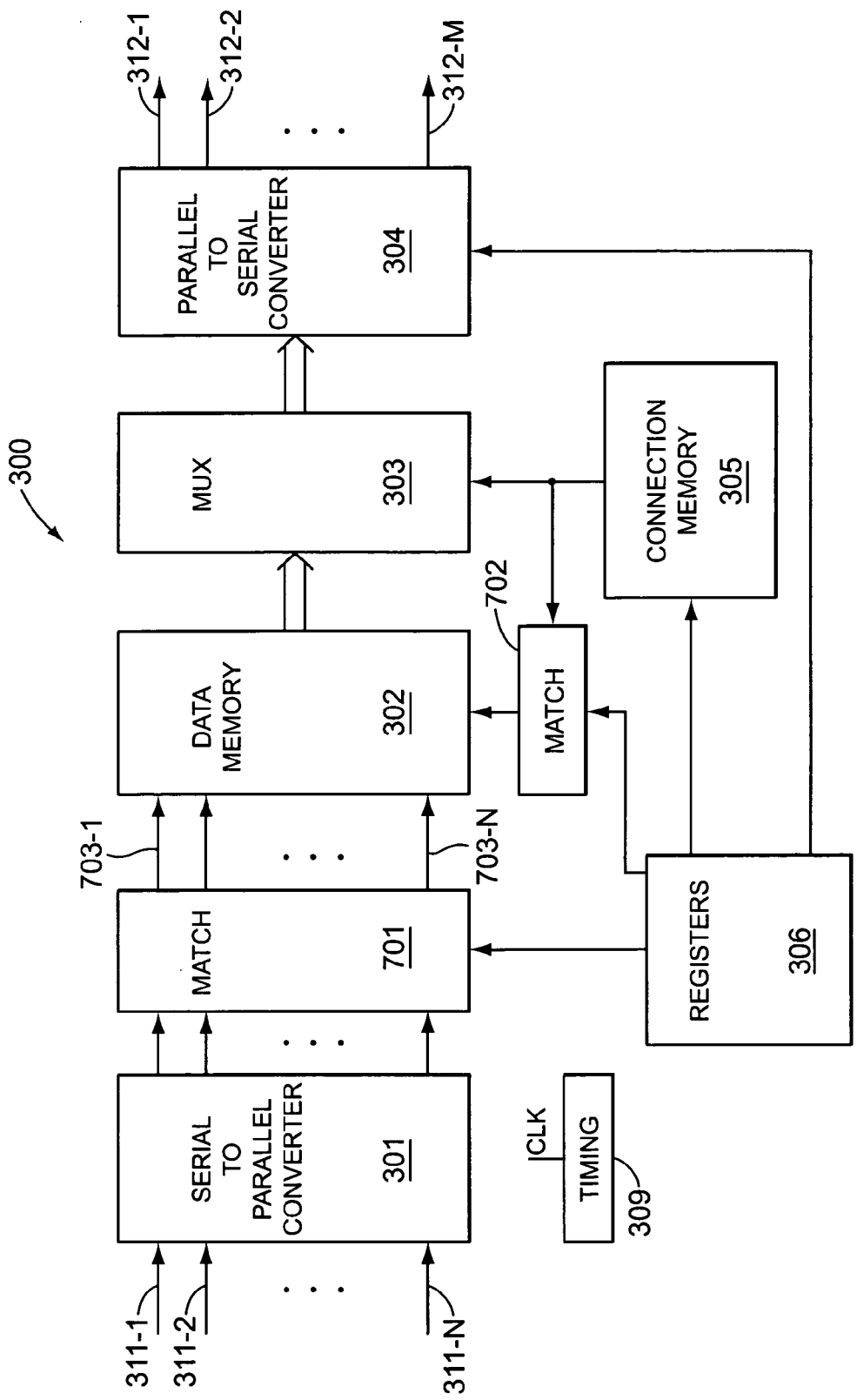

FIG. 7A shows a block diagram of an embodiment of TSIS 300 with rate matching according to the present invention. Matching circuit 701 is coupled between serial to parallel converter 301 and data memory 302. Matching circuit 301 received data at the rate of each of data streams 311-1 through 311-N and produces data streams 703-1 through 703-N at the fastest data rate R. As is shown in FIG. 7C, match 701 fills in time slots so that data is received at data memory 302 at the fastest rate, regardless of its received rate. As is shown, the data rate of each of input data streams 311-1 through 311-N is stored in registers of register 306. If data is received at a rate of R/2, then match 701 outputs each received channel twice at a rate R. Similarly, if data is received at a rate of R/$2^n$, then match 701 outputs each received channel $2^n$ times at a data rate R to match the input data stream to TSIS 300.

Figure 7E:
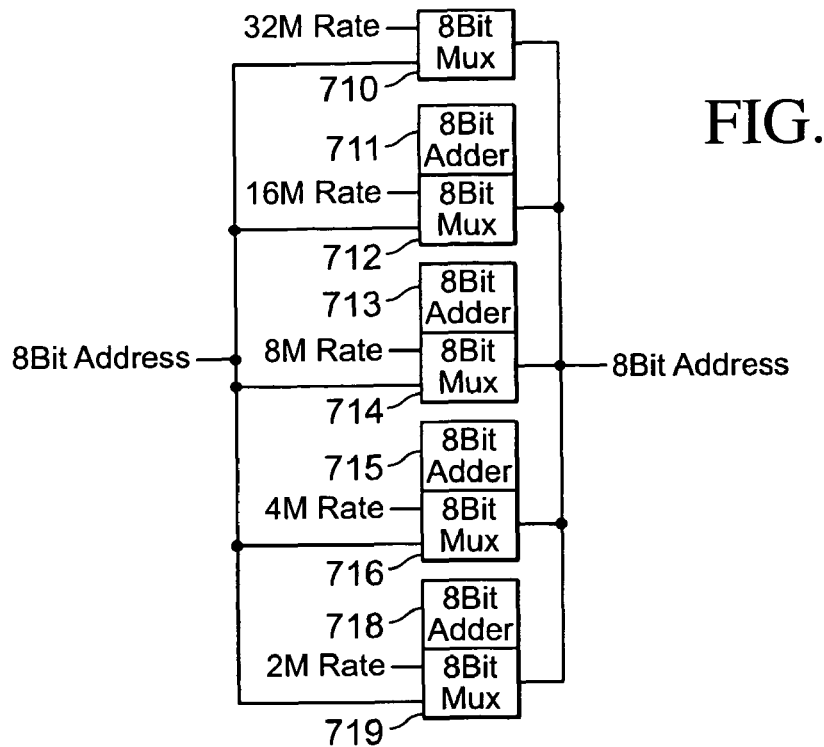
Figure 7F:
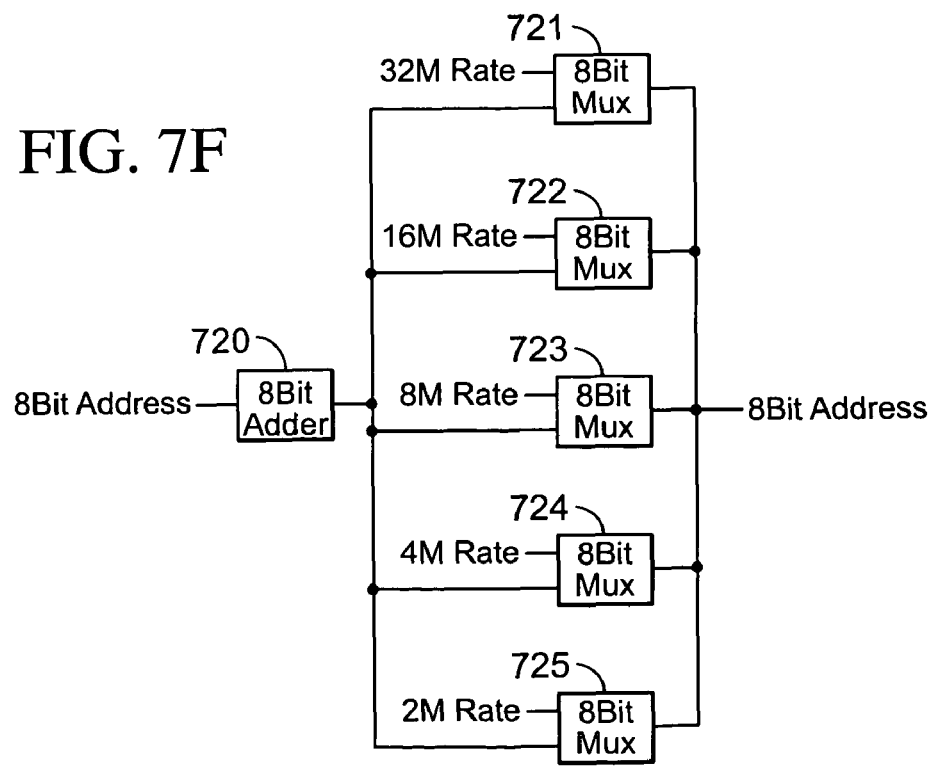

Data is then read out of data memory 302 in accordance with connection memory 305. In some embodiments, the address stored in connection memory 305 has been calculated to the matched rates. In some embodiments, the address from connection memory 305 is converted in match 702 to retrieve the requested channel data from data memory 302. FIGS. 7E and 7F show two embodiments of address conversion that can be utilized in match 702.

Channel data from data memory 302 is then input to multiplexer 303 and then to parallel to serial converter 304. Parallel to serial converter 304 outputs data streams 312-1 through 312-M each at a data rate set by a register in registers 306. Therefore, channel data received at any available data rate in one of data streams 311-1 through 311-N can be output at any available data rate in one of data streams 312-1 though 312-M.

FIG. 7E illustrates a conventional 9-bit address decoder for accessing rate matched data streams (i.e., selecting the time slot position in the data stream corresponding to the correct data rate). FIG. 7F illustrates a 9-bit address decoder for determining the time slot position in variable rate data streams according to the present invention. As shown in FIG. 7F, conventionally to generate the time slot addresses for an R/2 data rate the address at an R rate is shifted to the left by one bit and "11" is added. Similarly, for an R/4 data rate, the address at a data rate of R is shifted to the left by two bits and "111" is added. For an R/8 data rate, the R data rate address is shifted to the left by three bits and "1111" is added. Additionally, for an R/16 data rate, the R data rate time slot address is shifted to the left by four bits and "11111" is added. As shown in FIG. 7E, these operations are performed in muxes 710, 712, 714, 716, and 719 and adders 711, 713, 715, and 718.

In accordance with the present invention as shown in FIG. 7F, in each of these calculations, "1" is added first in adder 720. Then the R data rate address is shifted the left by the appropriate number of bits and the remaining "1" bits are added in muxes 721, 722, 723, 724, and 725. Because the shift leaves "0" values in the positions where "1" is added later, no additional adders are needed. Consequently, three adders are eliminated from the 32 Mb/s data rate (i.e., in the case where R-32 Mb/s) address to lower data rates.

Therefore, as shown in FIG. 7F first "1" is added to the R-Rate time slot address. Then the address is shifted by n-bits for a R/$2^n$ data rate and the least significant n bits (which are 0 because of the shift) are set to "1".

Figure 1:
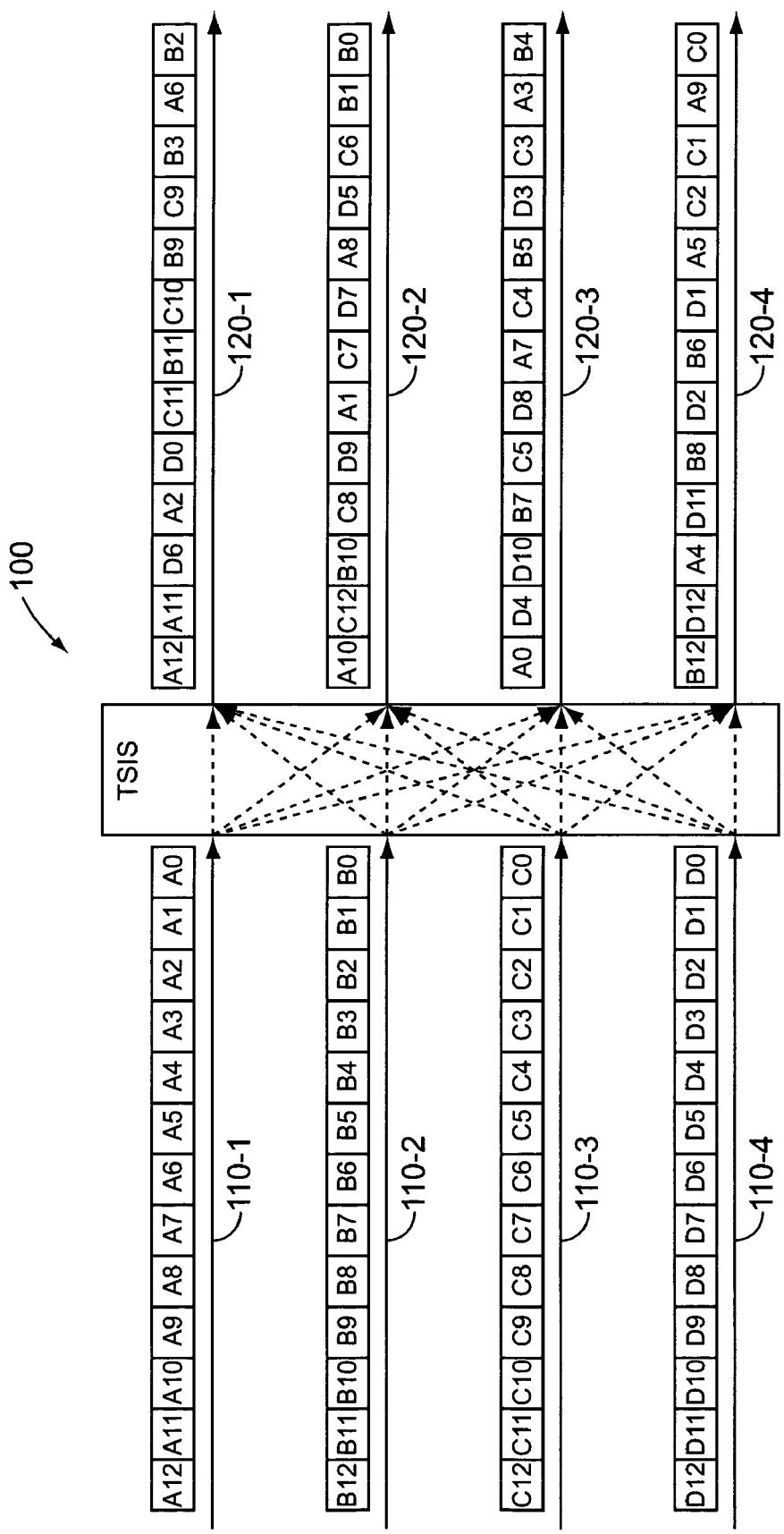
FIG. 1 illustrates operation of a time slot interchange switch.
Figure 2:
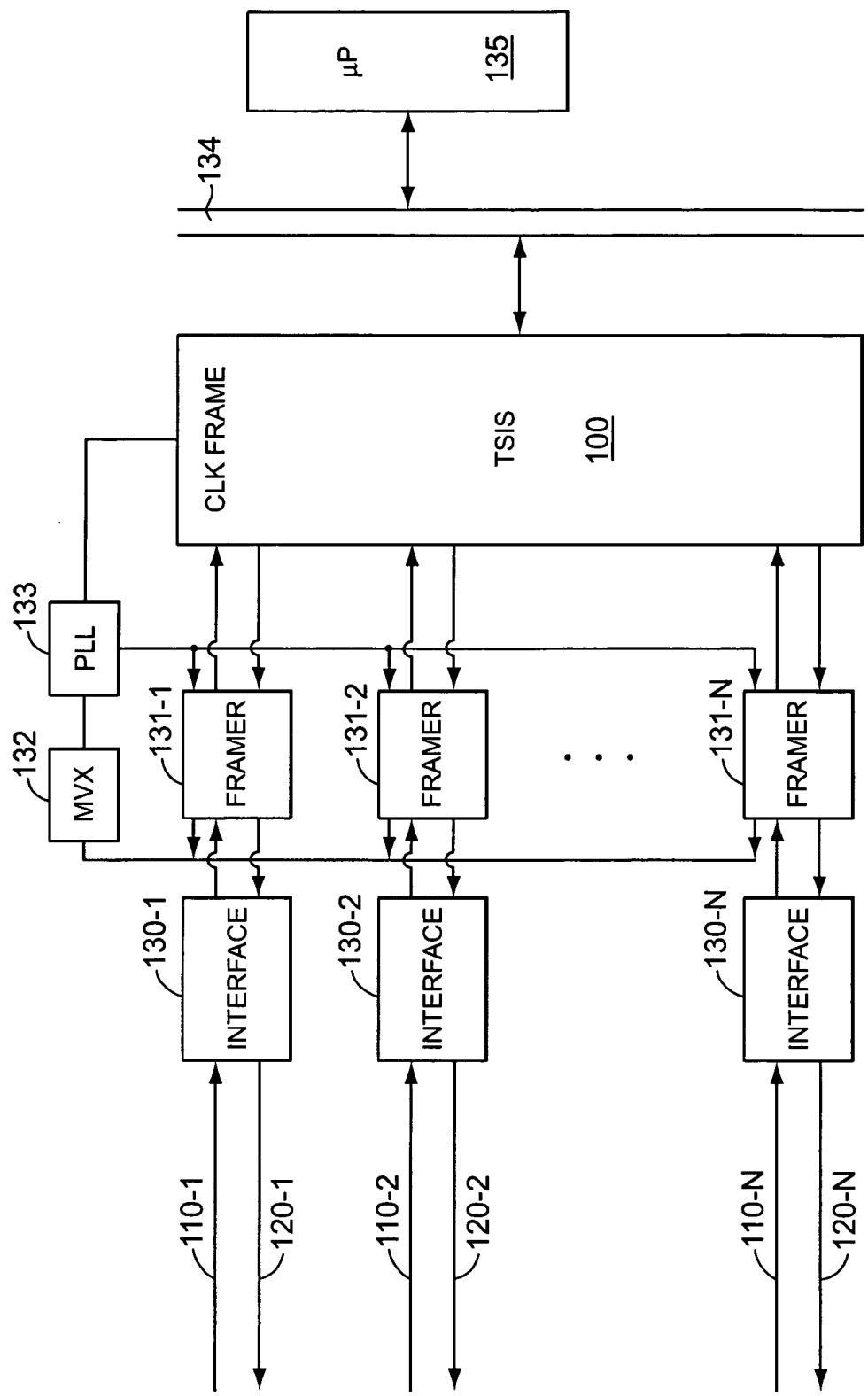
FIG. 2 illustrates a time slot interchange switch utilized in a switching system.

Rate matching according to embodiments of the present invention result in the elimination of complex circuitry that was previously required to insure that data is appropriately stored in data memory 302. Further, use of an address converter such as that shown in FIG. 2F can further reduce the number of addition circuits that need to be included in TSIS 300.

Further, a time slot interchange switch according to some embodiments of the present invention can include a serial to parallel converter that receives a plurality of data streams, each of the plurality of data streams providing data at one of a set of data rates; a matching circuit coupled to receive channel data from the serial to parallel converter and provide data at a maximum channel data rate, wherein the matching circuit fills in time slots with the channel data to provide data at the maximum channel data rate; a data memory coupled to store channel data provided by the matching circuit at the maximum channel data rate; and a parallel to serial converter coupled to receive data from the data memory and provide data to output data streams at one of a set of output data rates. Additionally, the switch may further include an address match circuit coupled between a connection memory and the data memory to calculate the address of data in data memory.

Accordingly, a method of rate matching in a time slot interchange switch according to the present invention can include receiving channel data from a plurality of data streams; providing a stream of channel data to a data memory at a maximum channel data rate, wherein the stream of channel data is generated by supplying the channel data one or more times until all slots of the stream of channel data is filled; reading data out from the data memory; and outputting the channel data.

Cache Memory

Figure 8A:
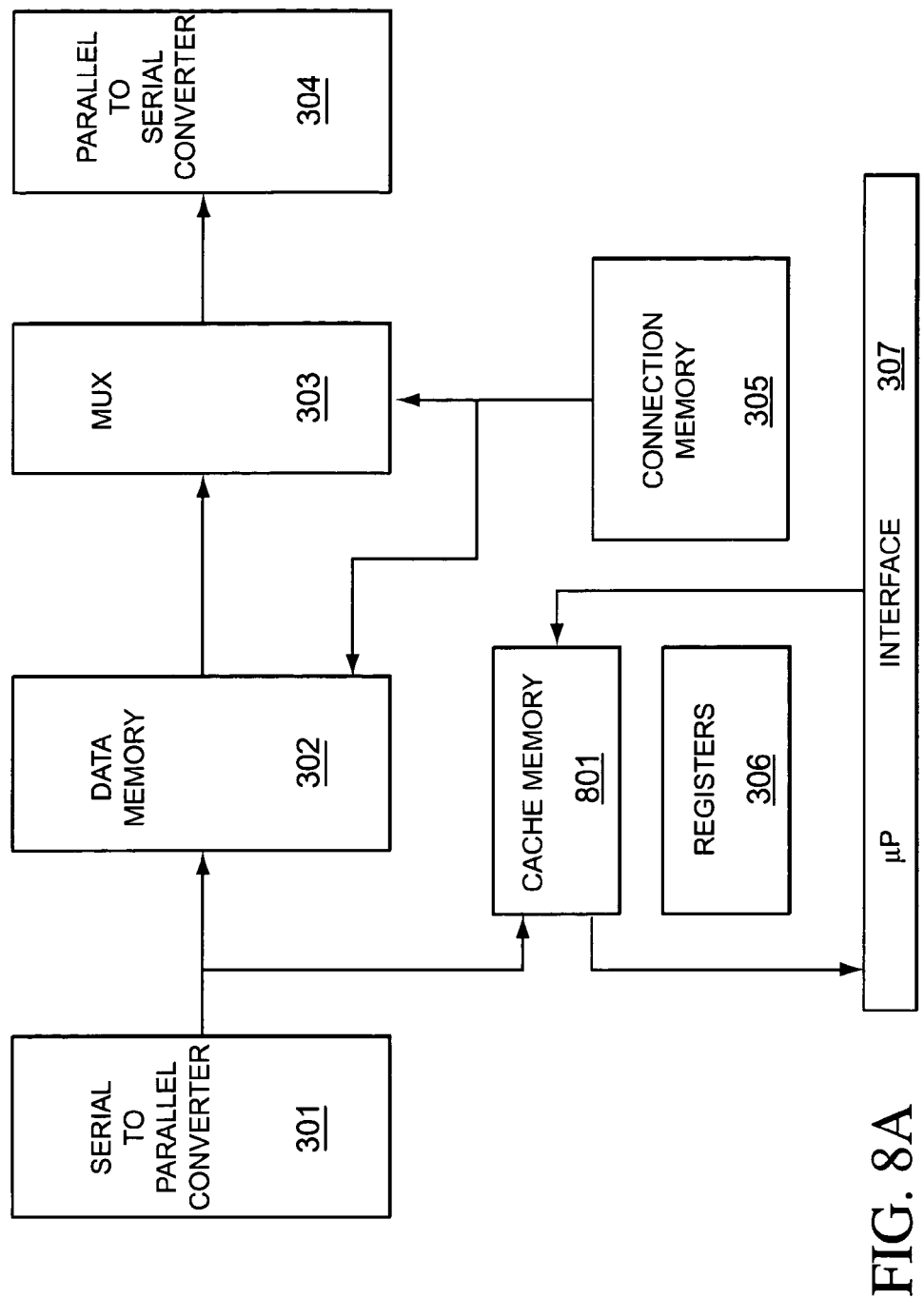
FIGS. 8A, 8B, and 8C illustrate cache memory in a TSIS that can be utilized in some embodiments of the present invention.

As is shown in FIG. 8A, some embodiments of TSIS 300 include a cache memory 801. Inclusion of cache memory 801 between data memory 302 and microprocessor interface 307 can eliminate one internal clock cycle to improve device speed. In some embodiments, a 33% increase in device speed can be realized.

As is shown in FIG. 8A, cache memory 801 receives data from serial to parallel converter 301 and temporarily stores data in parallel with data memory 302. Cache memory 801 can be accessed through interface 307 and provides data to interface 307 in response to addresses supplied through interface 307. Cache memory 801 can be large enough to store at least a frame of data.

Figure 8B:
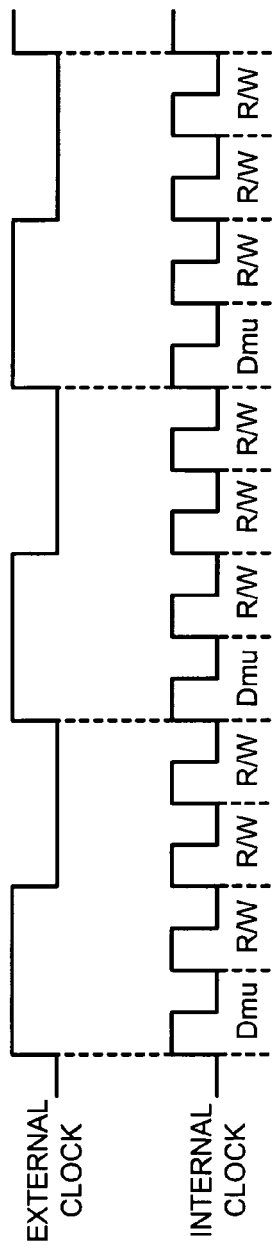

FIG. 8B illustrates timing for access of data in data memory 302 from interface 307 and output of data to multiplexer 303 and serial to parallel converter 301 in systems without cache memory 801. As is shown, the clock from timing 309 (FIG. 3) is divided into four clock cycles. In systems without cache memory, the first clock cycle is often reserved for access to data memory 302 through interface 307. The remaining three internal clock cycles can be reads to multiplexer 303 and writes from serial to parallel interface 301. In some embodiments, the internal clock can be no faster than the minimum access time of data memory 302. This limits the speed of the external clock because the internal clock must have an integer number of cycles within the external clock rate.

Figure 8C:
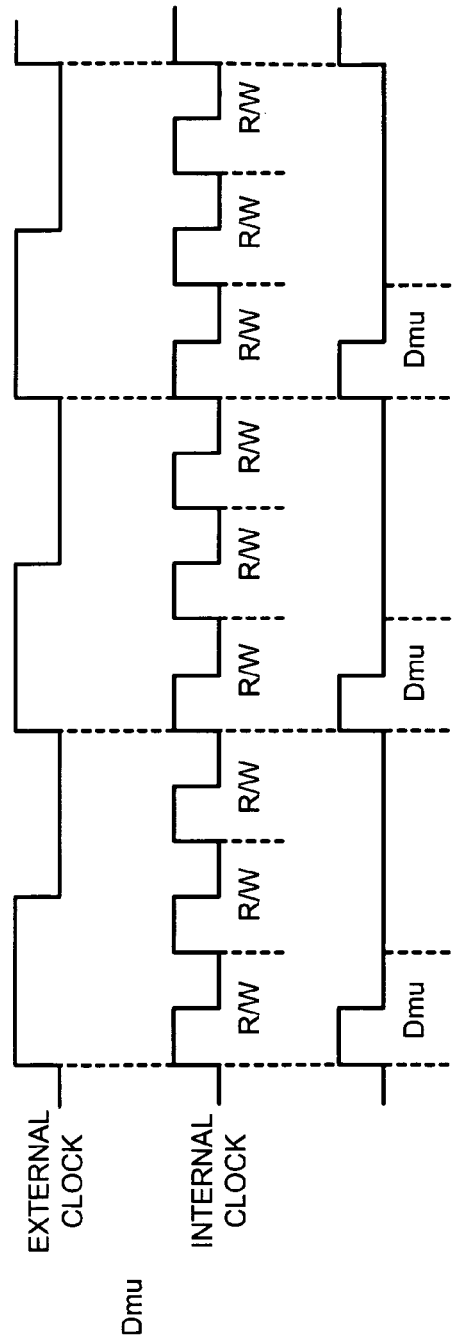

FIG. 8C illustrates the timing available with inclusion of cache memory 801. Because data is read from cache memory 801 through interface 307 instead of being read from data memory 302, no clock cycle for access to memory 302 needs to be reserved for microprocessor access. Therefore, to perform the same tasks as an embodiment of TSIS 300 without a cache memory 801, only three internal clock cycles are required instead of four. Utilizing the same internal clock speed, (i.e., a clock rate that matches the minimum access time requirements of data memory 302), the available external clock rate can be increased by 33%.

A time slot interchange switch according to some aspects of the present invention is further described in the product specification for the IDT product IDT72V73273, published in October of 2003, and IDT72V73263, published in October of 2003, each of which is herein incorporated by reference in its entirety.

A time slot interchange switch according to some embodiments of the present invention can include a data memory that receives and stores at least one stream of channel data; a cache memory that receives the at least one stream of channel data; and a microprocessor interface coupled to read data from the cache memory. Accordingly, a method of reading data from a time slot interchange switch to a microprocessor can include writing channel data to a cache memory in addition to a data memory; and providing data from the cache memory in response to requests from a microprocessor interface.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A time slot interchange switch, comprising:
a serial to parallel converter receiving at least one serial data stream and converting serial channel data in the at least one serial data stream into parallel channel data;
a data memory coupled to the serial to parallel converter to receive and store the parallel channel data, the parallel channel data including a bit error rate channel having bit error rate channel data;
a connection memory coupled to the data memory, wherein data is read out of data memory in response to addressing data stored in the connection memory;
a memory controller coupled to the data memory to control readout of the bit error rate channel received by the data memory;
a bit error rate receiver coupled to the data memory and the memory controller, the bit error rate receiver receiving the bit error rate channel from the data memory, converting the bit error rate channel data to serial data, and calculating a bit error rate;
a bit error rate transmitter coupled to the memory controller and a multiplexer through a latch, the bit error rate transmitter generating a burst signal for output from the time slot interchange switch in response to a request signal received from the memory controller; and a register block coupled to receive and store the bit error rate channel in a first register and store an address where the bit error rate channel is stored in the data memory.

2. The time slot interchange switch of claim 1, wherein the multiplexer can output channel data from the data memory or channel data generated by the bit error rate transmitter, the bit error rate transmitter generating a pseudo random number generated channel data in a time slot determined by an address stored in a third register of the register block.

3. A method of performing bit error rate testing in a time slot interchange switch, comprising:

receiving parallel bit error rate data for a bit error rate data channel;

storing the parallel bit error rate data in a data memory;

reading the parallel bit error rate data from the data memory in accordance with an address stored in a first register of a register block;

converting the parallel bit error rate data to serial bit error rate data and calculating a bit error rate;

storing the bit error rate in a second register in the register block; and further including:

generating a channel data appropriate for a bit error rate test; and outputting the channel data appropriate for a bit error rate test in an output data stream according to an address stored in a third register of the register block.

4. The method of claim 3, further including reading the bit error rate from the second register in the register block to a microprocessor.

* * * * *